United States Patent [19]

Hill

[11] Patent Number: 4,977,927

[45] Date of Patent: Dec. 18, 1990

[54] FREE FLOW FITTING

[76] Inventor: James H. Hill, Rte. 2, Box 40, Searcy, Ark. 72143

[21] Appl. No.: 465,440

[22] Filed: Jan. 16, 1990

[51] Int. Cl.⁵ ..................... F16K 15/00; F16K 17/06
[52] U.S. Cl. .................................. 137/539; 251/337;
184/105.3
[58] Field of Search ..................... 137/539; 251/337;
184/105.3

[56] References Cited

U.S. PATENT DOCUMENTS

| | | | |
|---|---|---|---|
| 2,454,252 | 11/1948 | Heim | 184/105.3 |
| 3,297,049 | 1/1967 | Moskovitz | 137/539 X |
| 3,489,172 | 1/1970 | Whitmore | 137/539 X |
| 3,807,432 | 4/1974 | Cain | 137/539 X |
| 4,365,648 | 12/1982 | Grothe | 137/539 |
| 4,373,333 | 2/1983 | Coleman | 137/539 X |
| 4,396,035 | 8/1983 | Maples | 137/539 |

Primary Examiner—John Rivell
Attorney, Agent, or Firm—Stephen D. Carver

[57] ABSTRACT

A high pressure lubricant fitting or check valve comprises an internal retainer generally in the form of a parallelipiped to prevent spring deformation and undesired plugging off during use. An inlet connects to a high pressure grease source for introduction of grease through an inlet passageway axially aligned with a larger diameter outlet passageway. The passageways are separated by a valve seat. A rigid retainer threadably mounts within the outlet passageway and defines dual flow paths of similar dimension and configuration. A ball valve which selectively blocks the valve seat to control fluid flow is biased by a spring coaxially mounted upon a rigid stem emanating from the retainer. Fluid flow is established about the outer periphery of the valve ball and around the spring and through the dual flow paths. In response to inputted lubricants, the ball and spring are forcibly deflected downwardly and limited by the rigid stem. Even when the ball valve is compressed against the stem by several thousand pounds of pressure, a blocking seal cannot be formed by the spring or ball. The retainer is locked within the outlet passageway to prevent blowout.

10 Claims, 3 Drawing Sheets

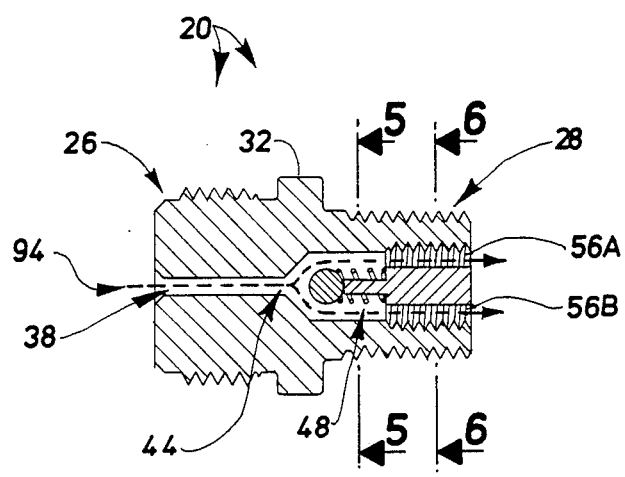
FIG. 3
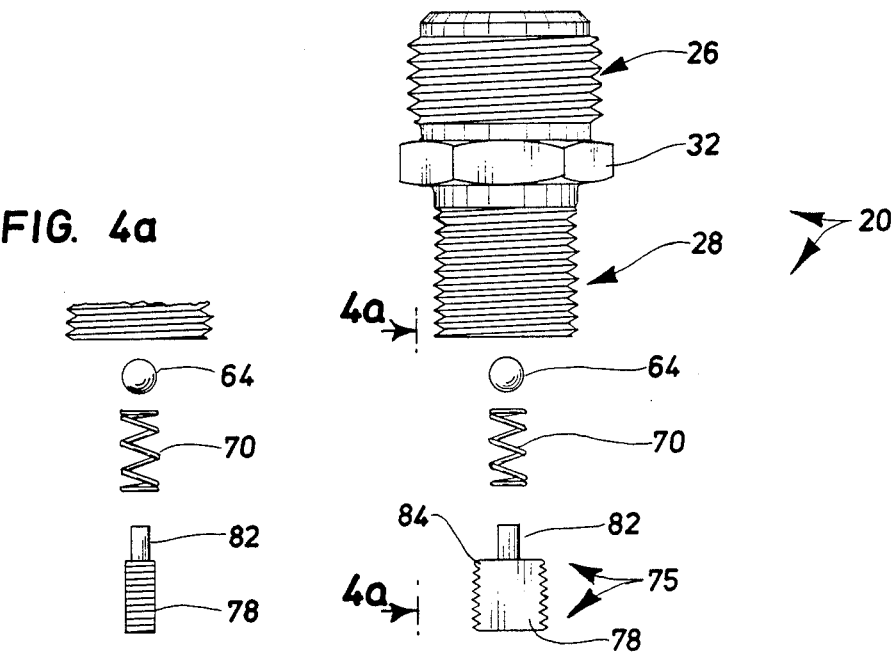
FIG. 4
FIG. 4a

FREE FLOW FITTING

BACKGROUND OF THE INVENTION

The present invention relates generally to high pressure grease fittings or check valves used on pumps, valves, flow actuators, compressors, or similar devices. More particularly, the invention relates to high pressure fittings or check valves which prevent clogging or blocking in response to high pressures.

As will be recognized by those skilled in the art, a wide variety of grease fittings have previously been employed to facilitate the introduction of lubricants and the like into equipment. In oil and gas pipeline apparatus, grease is commonly injected under extremely high pressures. Oil and gas equipment generates significant frictional forces, heat, and thermal expansion and contraction. Through time, such forces severely stress the seals, gaskets, and other internal components and undermine the integrity of the equipment. Viscous sealants, lubricants, grease, or the like, may be injected periodically to protect the equipment and prolong equipment life. Those skilled in the art commonly recognize that the viscosity of the sealant, grease, lubricant, or the like, is generally proportional to its sealing and lubricating capability.

"Heavy duty" sealants and lubricants, are quite effective for sealing high pressure equipment. In oil and gas pipeline applications, the force-feeding of "heavy" grease, sealants, or lubricants may necessitate input pressures in excess of 15,000 PSI. Typical high pressure grease fittings such as "button-head" fittings are widely used. A button-head fitting allows the grease or injection gun to be securely fastened within the fitting inlet during introduction of the lubricant.

However, numerous disadvantages are associated with prior art fittings such as button-head fittings and high pressure check valves. No button-head styled fitting known to me will perform consistently and flawlessly. In particular, injection of heavy sealants or lubricants into such prior art grease fittings has proven quite problematic.

Many known prior art fittings in this field of invention employ a "soft seat." This soft seat is formed by a ball, usually of steel construction which forcibly contacts a non-metallic elastomer ring, washer, or cup. The purpose of such a soft seat is to prevent reverse flow from escaping the fitting through the inlet end. In addition, the soft seat prohibits unwanted matter from entering the fitting. However, soft seats wear out quickly when subjected to sustained pressures.

At low pressures, a slight leak will cause the seat to "cut-out" or become grooved, causing permanent leaks. At high pressures, the whole seat can become distorted, thus limiting the usefulness of the fitting. A metal-to-metal seal provides adequate sealing for a pressurized, highly viscous substance. Because soft seals wear out so often, it is common to inject fittings with "bridging agents", minute solid particles which aid in sealing the gaps, cracks, leaks, and holes by collectively joining or spanning the opposing sides of the gap or crack. However, these agents cause other problems.

Besides problems faced with unreliable seals in prior art fittings, numerous other problems result from the injection of heavy substances. Fitting "plug-off" or clogging is related to failure of the usual valve element return spring. In most prior art fittings, the return spring forms a grease flow path through which lubricants or sealants flow. The lubricants flow in through the spring interior and are dispersed through the adjacent spring windings into the equipment being serviced. If the check valve element, typically a sphere, depresses the spring into an overcompressed state, the flow path will be blocked, and the spring may be deformed. In addition, spring twisting and bending can occur unless spring movements are rigorously constrained. A major problem encountered in the prior art is spring "cylinderization," wherein the return spring is compressed until its adjacent windings abut one another, and the spring thus forms a cylinder-like or tube. Cylinderization thus severely restricts grease outflow through the adjacent spring windings.

Additionally, the ball elements common in the vast majority of prior art fittings may reposition themselves atop the compressed spring, so that injection pressures are not properly dissipated. As a result, fitting "blow-out" may occur. "Blow-out" occurs when an induced pressure change in a plugged fitting causes the bottom crimp, or retaining ring to fail, resulting in a sudden drop in pressure as indicated by the grease gun pressure gage. When blow-out does occur, the internal parts of the fitting may be jettisoned into the equipment being serviced. Evacuation or "blow-down" of the attached pipeline or flow line must be initiated in order to facilitate replacement of the collapsed fitting and repair of any damaged equipment. The blow-down process is extremely time-consuming and expensive.

Moreover, if a fitting blows, gas back pressure can result in a calamity. For example, when the grease gun is uncoupled from the fitting, unwanted gas venting may occur. Even if the jammed fitting provides a seal, accumulated bridging agents may prevent full valve closure when grease input pressure is thereafter relaxed. A ruined fitting results. Also, when heavy substances clog and obstruct the lubricant flow paths, the equipment will not be properly lubricated.

Prior art fittings known to me usually plug-off at some time, especially when repeatedly injected with the heavier sealants. Attempts to clear the fitting by increasing the localized pressure within the fitting body will most often result in fitting blow-out. It is thus highly desirable for one to develop a fitting which is immune to spring deformations and fitting plug-off.

The pertinent prior art in this field of invention does not successfully address these problems. U.S. Pat. No. 4,347,915 employs an offset "leg" of the spring member to cause the ball member to drift to one side when the spring compresses. Theoretically, this ball drift increases the size of the flow channel within the axial hollow portion of the spring, and insures that the flow continues. However, when very heavy sealants with large bridging agents are injected into the fitting, the ball forces the leg member to bend downward during spring compression and ultimate cylinderization, permitting the ball member to substantially diminish the flow channel. Hence, this fitting has the propensity to plug-off. The '915 reference also discloses an internal sleeve member which purportedly prolongs the soft seat life. However, the sleeve does virtually nothing to prevent fitting plug-off.

U.S. Pat. Nos. 2,918,084 and 3,437,082 disclose a variety of spring, ball, and sleeve configurations. There is no means suggested in any these patents for preventing deformation of the spring members or plug-off as a result of severely diminished and restricted flow paths.

Hence, it is desired to provide a flow fitting which can withstand high localized pressures and accept very heavy sealants and lubricants for prolonged equipment life. Additionally, a fitting is needed which provides substantially unrestricted flow channels in which the injected sealants, lubricants, or the like, can travel without plugging-off the fitting.

SUMMARY OF THE INVENTION

The high pressure fitting or check valve of the present invention is used with devices requiring periodic greasing and maintenance, particularly devices such as high-pressure oil and gas hardware. The fitting provides a novel valve spring mounting system which directs the flow of injected fluids around rather than through the spring, and is thus immune to blocking as a result of valve spring deformation or cylinderization.

The grease fitting apparatus comprises rigid, threaded couplings defining an inlet end and an outlet end. The inlet is engageable by a conventional high pressure grease gun for inputting grease or sealants during maintenance of high pressure equipment. The inlet communicates with the outlet through an internally defined, generally tubular flow passageway, preferably divided into axially aligned inlet and outlet passageways. Preferably, the cross section of the inlet passageway and the outlet passageway are both circular, and the outlet passageway is of a larger diameter than the inlet.

A valve orifice is disposed between the inlet passageway and the outlet passageway for selectively permitting high pressure grease inputted through the inlet passageway to reach the larger diameter outlet portion for eventual delivery to the equipment to which the fitting is coupled. A valve element, preferably in the form of a rigid steel ball, is moved into and out of contact with a valve seat defined between the flow channel passageways to selectively block the valve orifice. The innermost portion of the outlet passageway is internally chamfered, forming the valve seat.

The valve element is controlled by a biasing system preferably in the form of a coiled spring. The spring is secured in the bottom of the flow channel coaxially within the outlet passageway. A threaded, somewhat flat retainer in the form of a parallelipiped is received within the outlet passageway. The retainer comprises an elongated, outwardly projecting stem which axially penetrates the spring interior and defines a stop for the valve element. The adjustable retainer may be subsequently locked into position to prevent fitting blowout.

The valve element moves freely axially up and down within the outlet passageway in response to pressure. When the ball is deflected by injected grease, the spring is compressed, and downward movement of the ball is limited by contact with the upwardly projecting retainer stop. The grease thus follows annular flow passageways defined about the outer periphery of the spring windings and on either side of the retainer. Thus, spring deformation thus does not affect or restrict the positive flow path. No grease flows through the spring in any event. When pressure is released, the spring will force the ball back into contact with the valve seat.

Thus the fundamental object of the present invention is to provide a high pressure flow control fitting or check valve which feeds injected grease around and not through the valve spring, whereby to avoid problems of spring deformation and cylinderization encountered with prior art fittings.

Another broad object is to provide an improved fitting for lubricating valves, pumps, flow actuators, and similar devices which is immune to blowout and plugging off.

A similar object of the present invention is to prohibit fitting plug-off.

Yet another object of the present invention is to provide means for insuring that flow passageways within the fitting remain open for substance flow substantially irrespective of viscosity, pressure, or spring deformation.

Another object of the present invention is to assure consistent smooth flow of even the heaviest commercially available sealants.

A further object of the present invention is to provide means for prolonging the useful life of flow-regulating equipment.

Another object of the present invention is to provide a high pressure flow fitting which extends the useful life of equipment and rarefies equipment failure.

Yet another object of the present invention is to maintain fitting integrity and stability despite the high pressure introduction of heavy substances.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 3 is a sectional view similar to FIG. 2 illustrating the fitting in an open position;

FIG. 4 is an exploded, side elevational view thereof;

FIG. 4A is a fragmentary, side elevational view thereof;

DETAILED DESCRIPTION OF THE DRAWINGS

Figure 1:
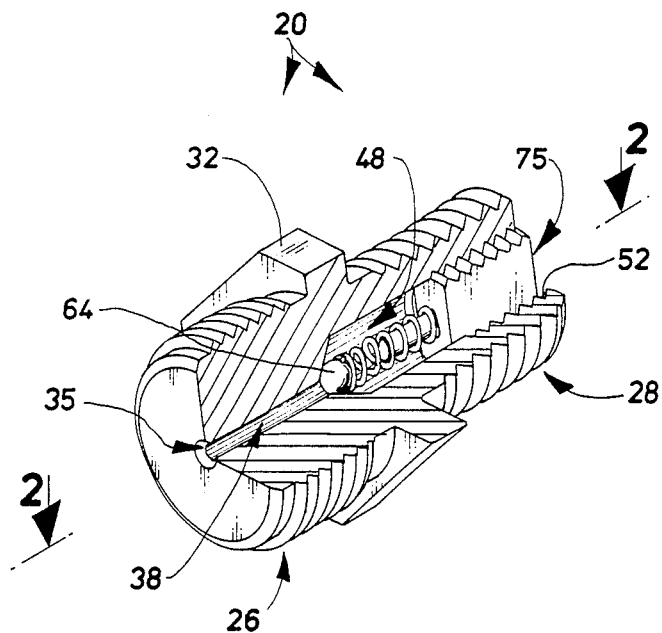
FIG. 1 is a fragmentary, isometric view of the preferred embodiment of my FREE FLOW FITTING, with portions thereof shown in section and/or broken away for clarity.

With initial reference now directed to FIGS. 1–4 of the appended drawings, the best mode of my free flow fitting is designated by the reference numeral 20. The invention may be employed as a fitting or a check valve in various types of equipment which require periodic lubrication, such as compressors, pumps, or the like. For purposes of brevity and clarity herein, the term "grease" is broadly used to refer to lubricants, greases, sealants, bridging agents, and similar fluids which are required for machine maintenance. The term "fitting" is broadly employed to refer to inlet fittings for use in connecting applications to grease guns, and to one way check valves adapted to be disposed within a fluid flow path.

Fitting 20 is of generally tubular configuration and comprises an inlet end 26 and an outlet end 28. The inlet end 26 is preferably externally threaded for receiving a high pressure grease gun or similar injecting device. The outlet end 28 is preferably threaded for mounting within the equipment to be maintenanced. Inlet end 26 is separated from outlet end 28 by an integral rigid nut portion 32 which facilitates manipulation of the fitting 20.

Inlet end 26 comprises a grease inlet orifice 35 which communicates with an elongated, tubular, inlet passageway 38 of generally circular cross section. Inlet passageway 38 terminates at its inner end in a chamfered valve orifice 44 (FIG. 3) through which injected grease enters the fitting.

Outlet end 28 comprises a larger diameter outlet passageway 48. As best viewed in FIGS. 2 and 3, outlet passageway 48 is axially aligned with inlet passageway 38 and is also of generally circular cross section. Outlet passageway 48 terminates in an internally threaded bore 52 which defines an outlet orifice 56.

A valve element 64, preferably comprising a conventional rigid steel ball, may be moved into and out of contact with valve orifice 44. As best viewed in FIG. 2, the chamfered shoulders of the valve orifice define a valve seat for the valve ball 64. It will be appreciated that valve element 64 must be larger in diameter than inlet passageway 38 and smaller in diameter than outlet passageway 48.

A coiled spring 70 or similar element biases the valve ball 64. Ball 64 is seated within the interior end of spring 70. As best viewed in FIG. 1, spring 70 is secured within outlet passageway 48 by a rigid retainer generally designated by the reference numeral 75.

Figure 7:
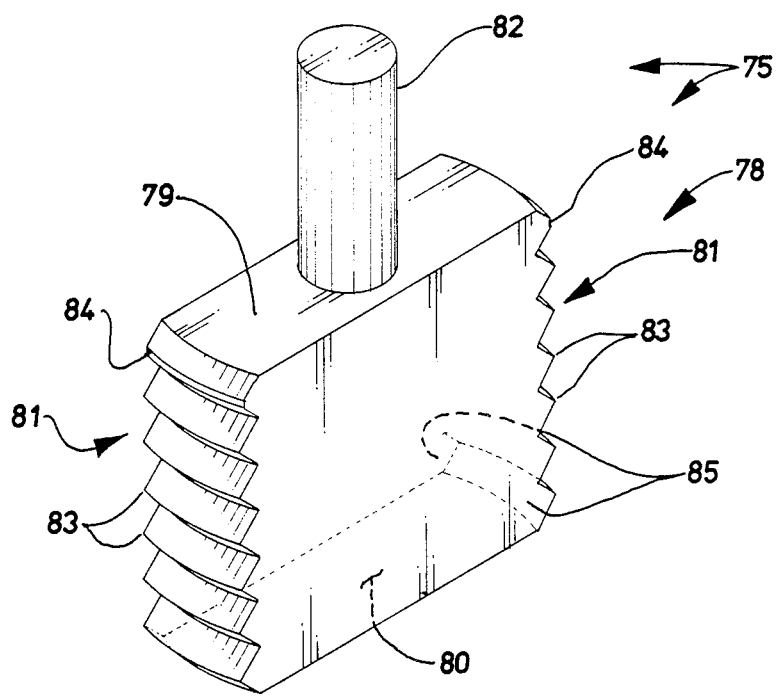

Retainer 75 comprises a generally rectangular-shaped, guide block 78, generally in the form of a parallelipiped. With primary reference to FIG. 7, block 78 comprises a planar, generally rectangular top 79 which is parallel with and spaced apart from a rectangular, planar bottom 80. The front and rear planar faces are denoted by the reference numeral 85. A pair of threaded edges generally indicated by the reference numeral 81 extend between top 79 and bottom 80. A rigid, generally cylindrical stem 82 projects outwardly from top 79. Screw threads 83 in the edges 81 terminate adjacent top 79 in an imperfect leader thread 84. The cutting edge of leader thread 84 of block 78 is dulled, whereby the block 78 is "locked" in position when installed and tightened appropriately. It thus cannot be rotated within threaded bore 52 by pressure within the system. The smooth, planar faces 85 extend between edges 81 and define fluid flow regions between themselves and the inner threaded surface regions of bore 52.

Figure 5:
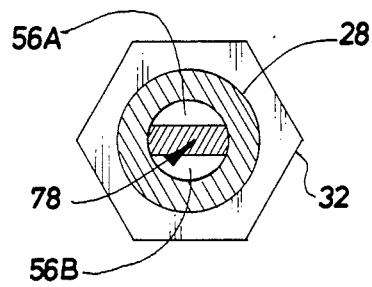
FIG. 5 is a fragmentary vertical sectional view taken generally along line 5—5 of FIG. 3.
Figure 6:
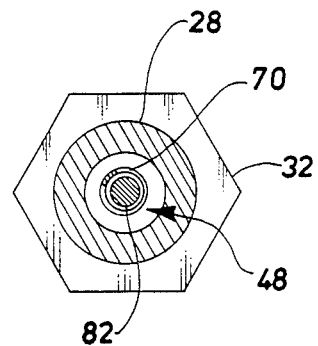
FIG. 6 is a fragmentary vertical sectional view taken generally along line 6—6 of FIG. 3; and, FIG. 7 is an enlarged isometric view of the preferred retainer employed herein.

Block 78 is mounted within threaded outlet bore 52. As best viewed in FIG. 5, the installed block 78 divides outlet orifice 56 into dual flow paths 56A, 56B of equal dimensions. Injected grease flows along surfaces 85 and out through the fitting into the equipment to be serviced.

Stem 82 projects outwardly from block top 79 into passageway 48, coaxially interiorly penetrating spring 70. Lubricants injected into input passageway 38 forcibly deflect valve ball 64 against spring 70. As best viewed in FIG. 3, at maximum downward deflection, ball 64 contacts rigid stem 82 and the windings of spring 70 are compressed together about stem 82. The fluid flow pathway generally indicated by dashed lines 94 (FIG. 3) delivers injected grease through inlet passageway 38 past valve orifice 44 and through outlet passageway 48. The grease is pressed outwardly around retainer block 78 and through outlet orifice 56.

Since grease is not forced through the center of spring 70 as in prior art fittings, deformation of the spring is not critical. Operation of my fitting is unaffected by spring "cylinderization" commonly experienced in prior art fittings. By virtue of stem 82, spring 70 cannot become overcompressed. Moreover, ball 64 is free to rotate within the end of spring 70 as grease flows along path. Because pressures exerted by inputted grease will be equal on all sides of the ball 64, the ball will not become disengaged from spring 70. Thus blocking and plugging off dangers associated with prior art fittings are avoided.

Figure 2:
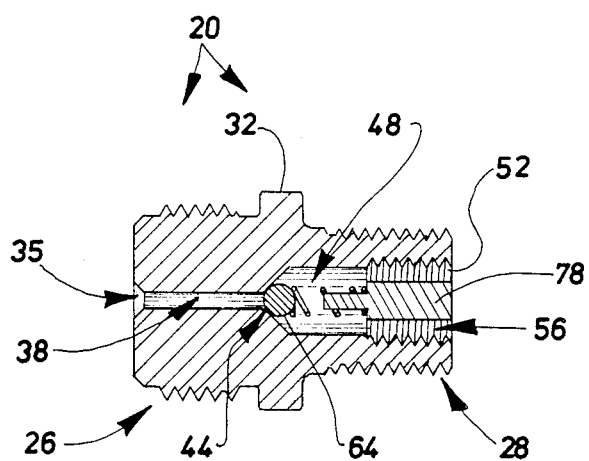
FIG. 2 is a longitudinal sectional view taken generally along line 2—2 of FIG. 1, illustrating the fitting in closed position.

FIG. 2 illustrates ball valve 64 in its quiescent or "closed" position in contact with the valve seat and blocking valve orifice 44. FIG. 3 illustrates the "open" position when valve ball 64 is moved away from the valve seat in response to inputted grease pressure. In the quiescent state, the valve ball 64 will abut the valve seat whereby to close inlet passageway 38. When a high pressure grease gun or other injection device is coupled to the fitting, high pressure input through the chamfered valve orifice 44 will cause the ball 64 to be deflected downwardly against stem 82, downwardly depressing the spring 70. The spring windings are tightly compressed about stem 82 and thus do not permit passage of grease therethrough. Because of the configuration disclosed, the opportunity for spring bending or twisting is obviated, and it will be impossible for an overcompressed spring to block the fluid flow path 94.

It will be appreciated by those skilled in the art that the present fitting may take on a variety of configurations and may be employed where desired as a check valve.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A one-way, free flowing fitting comprising:
   an inlet;
   an outlet having an interior threaded surface;
   valve means comprising a valve seat disposed between said inlet and said outlet and valve element means for selectively blocking said valve seat;
   spring means for normally yieldably biasing said valve element means into blocking contact with said valve seat;
   rigid retainer means for insuring consistent flow through said fitting, said retainer means comprising a block disposed within said outlet and a rigid stem projecting away from said block and coaxially penetrating said spring;

wherein a positive flow path is defined between said block and said outlet, and said block is generally in the form of a parallelipiped including a pair of spaced apart faces and a pair of threaded edges, and said positive flow path is at least in part defined between said block faces and said interior threaded surface of said outlet; and, whereby positive one-way flow is maintained through said inlet, around said valve element means and around said spring, and through said outlet around said retainer means.

2. The fitting as defined in claim 1 wherein said block comprises an imperfect leader thread for locking said retainer means within said outlet.

3. The fitting as defined in claim 2 wherein said block divides said flow path into dual grease channels of similar configuration.

4. The fitting as defined in claim 3 wherein said stem limits downward travel of said valve element means in response to inflow of injected grease.

5. A fitting for establishing one-way fluid flow communication from a source of lubricant, bridging agents, or grease to a piece of equipment, said fitting comprising:
- a threaded inlet end for receiving a grease gun or similar injection apparatus, said inlet end comprising an inlet passageway;
- a threaded outlet end for mounting said fitting within said piece of equipment, said outlet end comprising an internally threaded outlet passageway;
- a valve seat disposed between said inlet passageway and said outlet passageway;
- a ball valve for selectively blocking said valve seat;
- a spring disposed within said outlet passageway for yieldably biasing said ball valve into blocking contact with said valve seat;
- rigid retainer means disposed within said outlet passageway for limiting travel of said valve element whereby to insure consistent flow through said fitting, said retainer means comprising a rigid block generally in the form of a parallelipiped threadably mounted within said outlet passageway and a rigid stem projecting from said block and coaxially penetrating said spring;

whereby positive one-way flow is maintained through said fitting without flowing through the spring.

6. The fitting as defined in claim 5 wherein said block divides said outlet into dual flow channels of similar configuration.

7. The fitting as defined in claim 6 wherein said threaded block comprises an imperfect leader thread whereby said block may be threadably locked into said outlet passageway.

8. The fitting as defined in claim 3 wherein said stem limits downward travel of said valve element in response to inflow of grease.

9. A high pressure check valve adapted to be at least temporarily disposed in fluid flow communication between a pair of external apparatuses for selectively establishing a one-way flow of substances therebetween at high pressures, said check valve comprising:
- an externally threaded inlet end comprising an inlet orifice for receiving injected substances;
- an externally threaded outlet end comprising an internally threaded outlet orifice for outputting injected substances;
- a valve seat disposed internally within said check valve between said inlet end and said outlet end;
- valve means disposed within said outlet end for selectively blocking said valve seat;
- spring means disposed within said outlet end for biasing said valve means against said valve seat;
- a rigid retainer for securing said spring, said retainer comprising:
  - a rigid, generally rectangular, threaded block mounted within said outlet orifice to define dual flow paths through said outlet orifice, said retainer block comprising locking means for securing said block against rotation within said outlet orifice; and,
  - a rigid stem projecting from said block for coaxially mounting said spring and for limiting downward travel of said valve means in response to inflow of injected substances;

whereby positive one way flow is maintained through said valve seat and around said spring means.

10. The fitting as defined in claim 9 wherein said locking means comprises an imperfect leader thread.

* * * * *